March 6, 1956 S. F. DUNCAN ET AL 2,737,261
MULTIPLE STAGE SEPARATOR
Filed Sept. 15, 1952
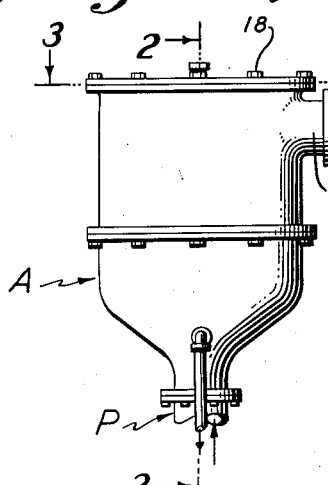
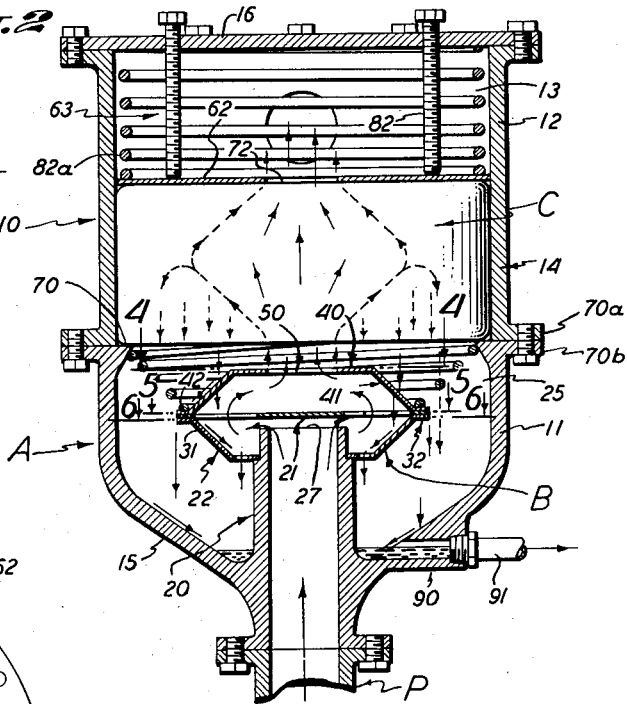
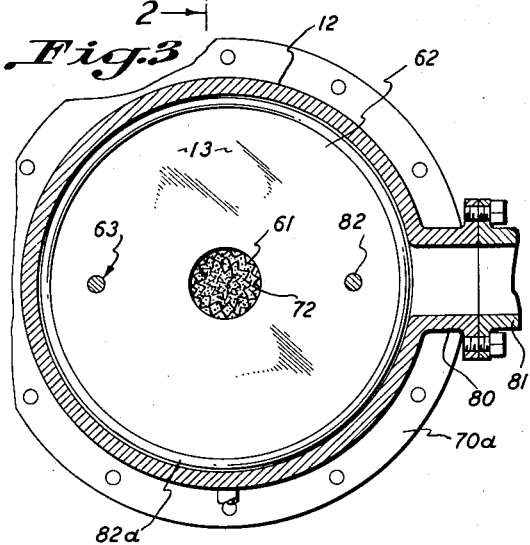
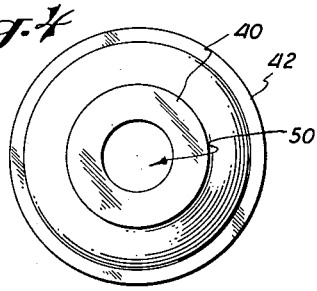
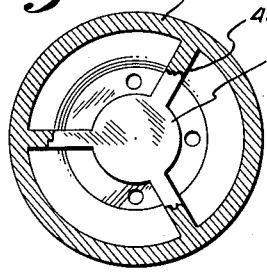
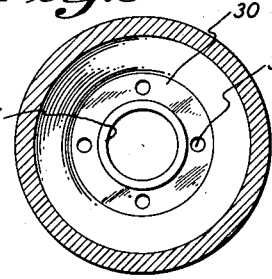
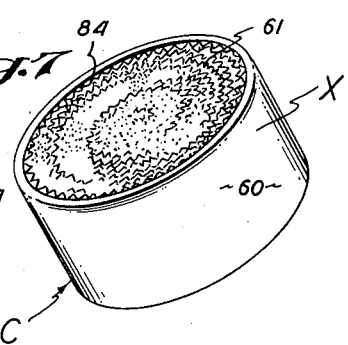
INVENTORS
Sydney F. Duncan
Allen W. Hardy
BY
*[signature]*
Attorney.

United States Patent Office 2,737,261
Patented Mar. 6, 1956

2,737,261

MULTIPLE STAGE SEPARATOR

Sydney F. Duncan and Allen W. Hardy, Los Angeles, Calif., assignors to Farr Company, El Segundo, Calif., a corporation of California Application September 15, 1952, Serial No. 309,672

1 Claim. (Cl. 183—34)

This invention has to do with a multiple stage separator, and it is a general object of the invention to provide a separator which is of simple, practical, improved construction and which, through a series of stages, serves to effectively and efficiently separate liquid from air or gas.

There are numerous situations where it is desired or necessary to separate liquids from gas or from air, and for purpose of example reference will be made to the separation of a liquid, such as oil, from air. It is to be understood, of course, that the invention is not to be considered as limited to this particular example, and it is to be recognized that the exact formation and construction as provided by the invention may, in practice, be varied, depending upon the particular materials to be handled, and possibly upon the size or capacity required.

It is a general object of this invention to provide a separator wherein the liquid to be separated from the air is removed in stages, that is, by means of a first stage serving to remove the major portion of the liquid, and by a second stage which serves to remove practically all of the remaining liquid.

It is another object of this invention to provide a separator of the general character referred to including a simple, practical, highly efficient construction wherein the first stage of separation is effected by a baffling action and is such that the liquid removed at this stage is removed by reason of being brought into contact with surfaces which are exposed and from which the liquid is effectively drained.

It is another object of this invention to provide a separator of the general character referred to wherein the second stage of separation is carried out in what may be referred to as a cell characterized by a porous pack in which the velocity of flow of the stream being handled is materially reduced, and in which the flow is so directed as to result in an accumulation of the liquid and a removal thereof through the action of gravity.

It is a further object of this invention to provide a separator of the general character referred to wherein there are but few simple, inexpensive parts, and wherein there is such an arrangement and relationship of parts as to make for a simple handling or servicing of the structure as conditions require.

It is another object of this invention to provide a separator of the general character referred to wherein the parts are of simple, efficient form and construction and in which the various elements are so mounted and related as to form a compact, rugged, practical construction.

In a typical structure embodying the invention there is a carrier or housing characterized by a vertical body which has a lower portion defining a chamber in which the first stage of separation occurs. An upper portion of the body defines an air chest adapted to receive the dry air and the body has an intermediate or middle portion carrying the cell in which the second stage of separation occurs. The structure effecting the first stage of separation is characterized by a duct discharging a stream of air upwardly in the lower portion of the carrier, a baffle in the path of the stream issuing from the duct and an air directing element preferably including a lower basin section and an upper nozzle section. The cell in which the second stage of separation occurs is located in the path of the stream issuing from the nozzle section of the structure and it preferably includes a case mounted in the carrier and occupied by a porous cell. The cell is of substantial size or capacity and, as a result of this and as a result of the arrangement and relationship of parts, the stream discharged to enter the pack is dispersed and the velocity of the stream is materially reduced. The general direction of flow is upward and outward and then upward and inward so that the stream finally discharges from the pack through an aperture or orifice provided in an orifice plate that covers the top of the pack. The stream of air issuing from the pack is dry and is received by the chest at the upper portion of the carrier from which part of the structure it may be discharged in any suitable manner.

The various objects and features of our invention will be fully understood from the following detailed description of a typical preferred form and application of the invention, throughout which description reference is made to the accompanying drawings, in which:

Fig. 1 is a side elevation of a typical structure embodying the invention. Fig. 2 is an enlarged, vertical, sectional view, being a view taken as indicated by line 2—2 on Fig. 1. Fig. 3 is an enlarged plan section, being a view taken as indicated by line 3—3 on Fig. 1. Fig. 4 is a plan view of a part of the structure, being a view taken as indicated by line 4—4 on Fig. 2. Fig. 5 is a plan section of a part of the structure, being a view taken as indicated by line 5—5 on Fig. 2. Fig. 6 is a plan section of a part of the structure, being a view taken as indicated by line 6—6 on Fig. 2, and Fig. 7 is a perspective view of the cell in which the second stage of separation occurs, this part being shown separate from the other elements of the structure.

The construction illustrated in the drawings and provided by the present invention includes, generally, a carrier or housing A, a means B adapted to effect the first stage of separation, a means C adapted to effect the second stage of separation, and various other parts and features of construction incidental to the major or main elements A, B and C.

The housing or carrier A is preferably characterized by a vertically disposed body 10 and in the preferred construction the body 10 is cylindrical in form. The body 10 has a lower portion 11 housing the means B, an upper portion 12 establishing a chest 13 that receives the dry air, and a middle portion 14 which carries the means C. The carrier A includes a bottom 15 that closes the lower end of the cylindrical body 10 and it includes a top or cover 16 that closes the upper end of body 10. In the preferred form of construction the bottom 15 is shaped to extend downwardly and inwardly from the lower end of body 10 to form a catch basin serving to catch or receive the liquid separated out of the air handled by the structure. The top or cover 16 is preferably a detachable or removable element, and in the case illustrated it is shown releasably secured in place by suitable fasteners 18.

If desired the body 10 may be sectional, and in a typical case it may be divided so that there is a joint between portions 11 and 14 or at shoulder 70, and suitable fasteners 70ª are provided to hold the sections together.

The means B provided by the present invention to effect the first stage of separation includes a duct which is in the nature of an inlet duct 20, a baffle 21 in the path of the stream issuing from the duct 20 and a flow directing element 22 cooperating with the duct 20 and baffle 21.

The inlet duct 20 is adapted to receive the wet stream of air from any suitable source, say, for example, from a pipe P, and it is preferably of such form and construction as to direct the stream upwardly at the center of the structure and onto the baffle 21. In the particular case illustrated the duct 20 is carried by the bottom 15 of carrier A and it is a simple, straight, tubular part, the lower end of which is connected to pipe P while the upper end is located in the chamber 25 formed by portion 11 of carrier A.

The baffle 21 is preferably a simple, flat plate, spaced a suitable distance above the discharge end 27 of the duct 20, and in the preferred construction it may be a round plate somewhat larger in diameter than the discharge opening provided at the upper end of duct 20. In the preferred construction the baffle is spaced but a short distance above the discharge end of the duct 20, so that there is a narrow opening through which the stream of air flows radially outward at an increased velocity.

The flow directing element 22 of the means B preferably includes a flat bottom 30, annular in form and located on the upper end of the inlet duct 20 in chamber 25, and it has a side wall 31 which projects upwardly and outwardly from the bottom 30 to terminate at a flange 32. The parts just described form in effect, a basin, and the bottom 30 of that basin is provided with one or more drain openings 34.

The flow directing element 22 has an upper section characterized by a flat top wall 20 and a side wall 41 which extends downwardly and outwardly from the periphery of wall 20 and which terminates at a flange 42.

The flanges 32 and 42 of the sections of the element 22 are joined or connected to define a chamber surrounding the discharge opening of inlet duct 20, and in the particular case illustrated an annular insert 44 occurs between the flanges 32 and 42 and has arms 45 projecting radially inward from it to carry the baffle 21. The annular insert 44, together with the arms 45 and the baffle 21, are preferably formed of a simple, flat sheet of material, in which case the insert occurs in the plane of the baffle and the flanges 32 and 42 are thus secured in the plane of the baffle. In practice the flanges may be joined or fixed to the insert by any suitable means.

The tapered or conical formation of the side walls 31 and 41 of the two sections of the element 22 establishes the flanged connection between the sections at a point spaced a substantial distance radially outward from the outer periphery of the baffle 21.

The upper section of the element 22 is, in effect, a nozzle section and the top 40 of this nozzle section has a central opening or aperture 50 from or through which the air handled by means B discharges upwardly. In the preferred construction the aperture 50 is located centrally of the structure and it may correspond in size with the discharge end of the inlet duct 20.

In practice we have found it desirable to hold means B in place on the end of tube 20 by a suitable spring 70$^b$ bearing upward on the underside of shoulder 70 and on the upper side of flange 42 of means B. By such suitable spring, means B will remain in place, even though pack C is removed for inspection, but by releasing the spring, means B may also be removed for inspection.

With the construction of means B, above described, the wet air discharged upwardly from the inlet duct 20 strikes the baffle 21 and is deflected outwardly to flow out and then up around the periphery of the baffle 21. After passing the baffle 21 the air flows inwardly and then turns upward to issue or flow up and out through the aperture 50. In the course of this flow or change of direction of the air, heavy or solid particles of liquid in the air so impinge upon the surfaces present as to be caught thereby. The velocity of the stream striking the baffle is such that there is little or no accumulation of liquid on the baffle.

However, the walls 31 and 41 of the sections of element 22, together with the other parts of these sections, receive the heavier or more solid particles of liquid present so that these parts or particles of liquid are caught and flow down by gravity within the element 21 to finally discharge through the openings 34. The liquid thus separated out by the means B falls into the bottom 15 of carrier A.

The means C includes, generally, a cell X which is adapted to be inserted in the carrier A so that it is located in the middle portion 14 of body 10. The cell in its preferred form includes a simple, cylindrical case 60 and a pack 61 within the case, retained therein by flanges 84 at the upper and lower ends of the case. The means C further includes an aperture plate 62 which overlies the pack 61. A suitable means 63 is provided for holding the cell X and the plate 62 assembled in the body 10.

In the case illustrated the case 60 of cell X is a simple, cylindrical element of such diameter as to slidably enter the body 10 from the upper end thereof when the cover 16 is removed, and it is of such length as to accommodate a pack 61 of the desired capacity. In the case illustrated the lower end of the case 60 rests on or is supported by a suitable shoulder 70 provided in the body 10 so that the cell, when in place, is supported a suitable distance above the top wall 40 of element 22.

The pack 61 carried in case 60 preferably occupies or completely fills the case and has a bottom end which opens downward toward, or is exposed to, the chamber 25 established by the lower portion 11 of the body 10. In practice the particular structure employed in the pack 61 may be varied, depending upon the service to which the structure is to be subjected. For purpose of example, the pack 61 will be referred to as a pack formed by an assembly of screens, for example, corrugated screens packed or wrapped securely together so that there is a porous or cellular structure having the desired degree of porosity.

The aperture plate 62 fits into the body 10 to cover or fit over the upper end of cell X, and it is characterized by a single, central aperture 72. The aperture 72 in practice preferably corresponds in size or diameter with the opening or aperture 50 in element 22. The aperture 72 serves to pass air from the pack 61 into the chest 13 established in the upper portion of the structure by the portion 12 of the body 10 and the cover 16 combined therewith. The plate may be arranged over the pack so as to be either above or below the uppermost flange 84. In the case illustrated the plate 62 is arranged over the upper flange 84.

The air received by the chest can be handled or discharged in any suitable manner. For example, as shown, a side outlet 80 may be provided and this part can, if desired, be connected to an outlet duct 81 as circumstances require.

The means 63 hereinabove referred to serves to retain the assembled plate 62 and cell X, and holds the assembly firmly on the shoulder 70. In the particular case illustrated the means 63 is shown as including a helical spring 82$^a$ under compression between the cover 16 and the assembly that is supported by the shoulder 70. The means 63 is shown as further including a plurality of clamp screws 82 threaded through the cover 16 to depend through the chest 13 so that they engage the top of the plate 62. In practice either spring 82$^a$ or the screws 82 can be eliminated, if desired. In the particular construction illustrated the lower flange 84 rests upon the shoulder 70 while the upper flange 84 supports the periphery of the plate 62.

With the construction above described the stream of air issuing from the element 22 of means B enters the lower end of the pack 61, and as it flows up through the pack 61 it is dispersed, that is, it flows radially outward and then finally turns and flows radially inward, so that the main or general direction of flow is substantially as indicated by the arrows in Fig. 2. As a result of this flow or dispersion of the stream there is first a substantial drop in velocity, and then a substantial increase in velocity as the stream flows toward the top of the pack.

The initial dispersion of the stream entering the pack 61 causes the liquid remaining in the stream after passing means B to impinge on the elements of pack 61 and to flow or be carried upward and radially outward, and as it thus moves or flows outward it is caught or trapped by the cellular structure of pack 61. As the liquid thus caught or trapped accumulates it is acted upon by gravity, and as a result of this it drops or flows down through the pack and finally drops from the bottom of the pack 61 into the chamber 25. In practice it has been found that the major portion of the liquid thus accumulated and dropped out of the pack 61 finally drops from the outer peripheral portion of the pack, and as it thus drops it falls either upon the downwardly and outwardly pitched wall 41 of the upper section of element 22, or it drops straight down, clearing the element 22. In either case the liquid thus separated out and falling by gravity is caught by the bottom 15 of the carrier A. In the particular case illustrated a drain or outlet 90 is shown provided at or in connection with the bottom 15, and if desired a drain line 91 may be connected to the outlet 90.

Having described only a typical preferred form and application of our invention, we do not wish to be limited or restricted to the specific details herein set forth, but wish to reserve to ourselves any variations or modifications that may appear to those skilled in the art and fall within the scope of the following claim:

Having described our invention, we claim:

Apparatus for separating a liquid from a gas comprising a housing, an inlet duct entering said housing from the bottom and projecting upwardly into the interior of said housing, said inlet duct having a discharge opening at its upper end, a flow directing element comprising an annular lower basin portion mounted upon said inlet duct below said discharge opening and projecting upwardly and outwardly therefrom to an annular flange, a flow directing baffle fixedly supported at a position spaced above said discharge opening in the path of liquid discharged therefrom to direct fluid outwardly from said inlet duct, and an upper portion secured to said flange and projecting upwardly and inwardly therefrom to define with said basin portion a chamber surrounding said discharge opening, the walls of said chamber being spaced from said baffle to provide an annular opening for the passage of fluid upwardly beyond said baffle, said upper portion having an opening in its upper surface in alignment with said baffle and of a size corresponding to said discharge opening whereby fluid discharged from said inlet duct may expand and condense within the chamber defined by said basin portion and said upper portion and be emitted from said opening in said upper portion at a velocity corresponding to the velocity of fluid in said inlet duct; a porous pack mounted within said housing above said flow directing element and substantially filling the central interior portion of said housing, a plate covering the upper surface of said pack and having an aperture therein in vertical alignment with and of a size corresponding to said discharge opening whereby fluid emitted from said opening in said flow directing element may disperse upwardly and outwardly therefrom at a reduced velocity within said porous pack during the separation of liquid from said fluid, said reduced velocity being increased to a velocity corresponding to the velocity of fluid emitted from said last mentioned opening upon passage of fluid through said aperture.

References Cited in the file of this patent

UNITED STATES PATENTS

| | | |
|---|---|---|
| 83,506 | Justi | Oct. 27, 1868 |
| 220,118 | Berry | Sept. 30, 1879 |
| 393,614 | Burkhard | Nov. 27, 1888 |
| 768,627 | Schlieper | Aug. 30, 1904 |
| 1,376,691 | Hartman | May 3, 1921 |
| 1,426,177 | Garner | Aug. 15, 1922 |
| 1,751,915 | Hall et al. | Mar. 25, 1930 |
| 1,841,691 | Wilson | Jan. 19, 1932 |
| 1,947,797 | Radford | Feb. 20, 1934 |
| 2,048,956 | Smith | July 28, 1936 |
| 2,400,719 | Stackhouse | May 21, 1946 |

FOREIGN PATENTS

| | | |
|---|---|---|
| 49,115 | Germany | Oct. 17, 1889 |